(12) United States Patent
Matsumura et al.

(10) Patent No.: US 8,488,205 B2
(45) Date of Patent: Jul. 16, 2013

(54) METHOD OF EMBEDDING A PLURALITY OF DIFFERENT TWO-DIMENSIONAL CODES IN AN IMAGE

(75) Inventors: Akari Matsumura, Yokohama (JP); Masahiro Takizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/354,538

(22) Filed: Jan. 20, 2012

(65) Prior Publication Data
US 2012/0113478 A1 May 10, 2012

Related U.S. Application Data

(62) Division of application No. 12/202,506, filed on Sep. 2, 2008, now Pat. No. 8,115,966.

(30) Foreign Application Priority Data

Sep. 3, 2007 (JP) .................................. 2007-228148
Feb. 5, 2008 (JP) .................................. 2008-025744

(51) Int. Cl.
*H04N 1/40* (2006.01)

(52) U.S. Cl.
USPC ........................................ 358/3.28; 358/1.18

(58) Field of Classification Search
USPC ............... 358/3.28, 1.9, 2.1, 1.13–1.18, 468, 358/450, 462; 382/173, 181, 135; 283/113
See application file for complete search history.

(56) References Cited

U.S. PATENT DOCUMENTS

| 5,758,043 A | 5/1998 | Takizawa et al. |
| 6,091,844 A | 7/2000 | Fujii et al. |
| 7,006,257 B1 | 2/2006 | Yamazaki et al. |
| 7,548,340 B2 | 6/2009 | Ishikawa et al. |
| 8,115,941 B2 | 2/2012 | Takahashi |

FOREIGN PATENT DOCUMENTS

| JP | 2000-122837 | 4/2000 |
| JP | 2000-184171 | 6/2000 |
| JP | 2002-305646 | 10/2002 |
| JP | 2004-153568 | 5/2004 |
| JP | 2007-088827 A | 4/2007 |

OTHER PUBLICATIONS

Japanese Office Action, dated Sep. 18, 2012, issued by the Japanese Patent Office in Japanese Patent Application No. 2008-025744.

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

The purpose of the present invention is to prevent a two-dimensional code to be additionally embedded from corrupting a two-dimensional code which has been embedded when a document in which the two-dimensional code has been embedded is copied or when a document in which the two-dimensional code has been embedded is overlaid on form data in which the two-dimensional code has been embedded. In the present invention, when it is detected that a second two-dimensional code is embedded in an input image, the input image is printed without overlay of a first two-dimensional code thereon. Furthermore, when form data for overlaying is stored, when it is detected that a third two-dimensional code is embedded in the form data or when it is detected that a second two-dimensional code is embedded in an input image, the input image is output without overlay of a first two-dimensional code thereon.

13 Claims, 15 Drawing Sheets

FIG.15

METHOD OF EMBEDDING A PLURALITY OF DIFFERENT TWO-DIMENSIONAL CODES IN AN IMAGE

This application is a divisional of U.S. patent application Ser. No. 12/202,506, filed Sep. 2, 2008, and allowed Sep. 30, 2011.

BACKGROUND OF THE INVENTION

1. Field of the Invention

The present invention relates to a method for embedding a plurality of different two-dimensional codes in an image, and in particular to a method for embedding a new two-dimensional code in an image so as not to corrupt a two-dimensional code which has already been embedded in the image.

2. Description of the Related Art

A two-dimensional code technology exists for embedding electronic data in a paper by printing an image pattern generated by encoding the electronic data, optically reading the image, and extracting the electronic data. It has become possible to embed more electronic information in a paper by embedding information using a two-dimensional code.

Since a two-dimensional code can be embedded and read with one machine when a copy machine having both a printing function and a scanning function is used, systems peculiar to a copy machine using a two-dimensional code have been developed. For example, a system exists for embedding information indicative of a confidential document in a printout as a two-dimensional code, determining whether or not the printout is a confidential document prohibited from being copied when copying the printout in an image forming device, and stopping the copy operation if the printout is a confidential document (Japanese Patent Laid-Open No. 2002-305646). In addition, a system exists for embedding a usage log of an image forming device in a paper document and using the usage log to track the document. Furthermore, a system exists for embedding a two-dimensional code as image information itself and printing an original image on the basis of the image information acquired by scanning the two-dimensional code (Japanese Patent Laid-Open No. 2004-153568). Furthermore, a system exists for previously storing a document in an image forming device, synthesizing the previously stored document and another document, and printing a synthesized image (Japanese Patent Laid-Open No. 2000-122837).

Optimal embedding methods are selected and used in accordance with the intended use. Two-dimensional code embedding methods can be classified into two types as follows.

| Type | Description | Features |
|---|---|---|
| (A) Iterative embedding method | A two-dimensional code is embedded iteratively in a whole surface of a document. | Resilience of a two-dimensional code is high because the two-dimensional code is iteratively embedded in a document. Information can be restored even if part of the two-dimensional codes is lost. |
| (B) Simple embedding method | A two-dimensional code is embedded in part of a surface of document. | A lot of information can be embedded because information is embedded in high density. Information can not be restored if part of the two-dimensional code is lost. |

FIG. 1 shows a document in which a two-dimensional code is embedded using the iterative embedding method and a document in which a two-dimensional code is embedded using the simple embedding method.

Reference numeral 10 denotes a document in which two-dimensional codes are embedded by the iterative embedding method. Each of rectangles enclosed with dotted lines in the figure is an information embedded tile. The dotted lines are not actually printed, but are shown in the figure to plainly show the presence of the information embedded tiles. The same information is embedded in all of the information embedded tiles printed in the whole surface of the document 10, so that the information can be extracted even from a part of the surface of the document. Thus, a document in which two-dimensional codes are embedded by the iterative embedding method is resilient to stains, wrinkles, etc. Furthermore, the iterative embedding method prints two-dimensional codes in a whole surface of a document and therefore often generates a pattern using dots, lines, etc. for information embedding in order to reduce the visibility of the two-dimensional codes.

On the other hand, reference numeral 20 denotes a document in which a two-dimensional code is embedded by the simple embedding method. The two-dimensional code is printed on the lower right of the document in the figure. In the case of the simple embedding method, if part of a two-dimensional code is chipped or the two-dimensional code gets dirty, information can not be extracted from the two-dimensional code. However, the simple embedding method has the advantage of embedding a large amount of information in a document because it generates a high density two-dimensional code.

A system for determining whether or not a document is confidential often uses the iterative embedding method. On the other hand, a system for embedding image information for use handles a lot of information and therefore often uses the simple embedding method.

Next, the outline of a system which is proposed in Japanese Patent Laid-Open No. 2000-122837 will be discussed. The system performs overlay (synthesizing) a previously stored document onto another document, and printing the thus acquired synthesized image. FIG. 11 is a block diagram showing a data flow of the system proposed in Japanese Paten Laid-Open No. 2000-122837. In FIG. 11, reference numeral 1003 denotes a ROM (program ROM). The ROM 1003 stores a control program including the following modules.

Reference numeral 201 denotes a form generating module for generating a form file 207. Reference numeral 202 denotes an embedded data generating module for generating an embedded data file 208. Reference numeral 203 denotes a composite file generating module for generating a composite form file 209 from the multiple form files 207 and embedded data files 208. Reference numeral 204 denotes a memory expansion module for expanding the composite form file. Reference numeral 205 denotes a sequential analysis processing module for sequentially analyzing the expanded composite form file. Reference numeral 206 denotes an overlay module for allowing a printer to perform overlay printing according to the settings acquired by analyzing the composite form file. The memory expansion module 204, the sequential analysis module 205, and the overlay module 206 are collectively referred to as a run time library module or an overlay specifying module.

Reference numeral 1002 denotes a RAM functioning as a memory into which the above modules are loaded, and a form object is stored therein. The form object is form data and embedded data (field data). Furthermore, the RAM 1002 is also a work area.

Reference numeral 1009 denotes a hard disk in which a database, an embedded data file, a form file, and a composite form file are stored. Reference numeral 207 denotes a file consisting of form data generated by the form generating module 201. Reference numeral 208 denotes an embedded data file consisting of embedded data (referred to as field data or appended data) generated by the embedded data generating module 203. Reference numeral 209 denotes a composite form file defined from multiple form files generated by the composite file generating module 203. The composite form file 209 is defined as an information file which has both of form information managing multiple types of forms as one relating continuous form, and output information of paper cassettes for output for each of the forms, and the like. Reference numeral 210 denotes a database to which the embedded data generating module 202 makes an access to generate the embedded data file 208 as discussed later.

Overlay data (including form data and embedded data) generated by respective program modules stored in the ROM 1003 is passed to an OS. The OS associates a data function (GDI function) output from an application with a common data function (DDI function) which can be recognized by an output device and outputs the data function to a printer driver 211 designated by the application. A function association component for processing this is part of the function of the OS and corresponds to a GDI of Windows. This function is publicly known and therefore the detail description regarding the function is omitted.

The printer driver 211 analyzes a data function (DDI function) input from the function association component of the OS and generates print data using a page description language (PDL) capable of print processing. The generated print data is output and sent to the printer as a printing device. The printer generates bitmap data as specified by the print data and prints out it. The printer is capable of performing overlay. The printer receives print data for a form and print data for embedding, performs overlay processing, and then prints thus acquired print data. If the printer has no overlay function, the printer driver 211 may generate print data of all pages by performing overlay processing and send the print data to the printer.

In this way, systems using two-dimensional codes use various two-dimensional codes according to their objects and therefore may use multiple different two-dimensional codes at the same time. In other words, it is possible to print multiple different two-dimensional codes on the same paper. When multiple different two-dimensional codes are used at the same time, the two-dimensional codes thereof interfere with each other and thereby information may not be able to be read from each of the two-dimensional codes. In other words, if a system using multiple different two-dimensional codes at the same time, when copying a document in which a two-dimensional code has already been embedded, performs printing while adding a new two-dimensional code thereon, the two-dimensional code already embedded may be corrupted.

Furthermore, systems using two-dimensional codes use various two-dimensional codes according to their objects and therefore may use multiple different two-dimensional codes at the same time. For example, a system exists for overlaying a document in which a two-dimensional code has already been embedded onto form data in which a two-dimensional code has already been embedded, and then prints thus acquired image. This printing system may not be able to read information from each of the two-dimensional codes because the two-dimensional codes thereof interfere with each other. In other words, after a document in which a two-dimensional code has already been embedded is overlaid onto form data in which a two-dimensional code has already been embedded, if a new two-dimensional code is added thereon for printing, the two-dimensional codes already embedded may be corrupted.

Systems making a form overlaying function unusable when making a function using a two-dimensional code effective in order to prevent the two-dimensional codes already embedded from being corrupted can be easily considered, but may impair user's convenience.

SUMMARY OF THE INVENTION

An object of the present invention is to prevent a two-dimensional code to be newly embedded from corrupting a two-dimensional code already embedded, when copying a document in which the two-dimensional code has already been embedded.

Further, another object of the present invention is to prevent a two-dimensional code to be newly embedded from corrupting a two-dimensional code already embedded, when overlaying a document in which a two-dimensional code is embedded onto form data in which a two-dimensional code has already been embedded and then printing thus acquired image.

A device according to the present invention includes a specifying component configured to specify overlay of a coded image onto an input image, and a control component configured to specify, when a coded image has already been embedded in the input image before overlaying a coded image for overlay onto the input image, whether or not to overlay the coded image for overlay onto the input image depending on the type of the coded image for overlay.

A device according to the present invention includes, when used in a case that a coded image as the type to be iteratively embedded into an entire input image has already been embedded in the input image, a component configured to perform control not to overlay a coded image to be overlaid onto the input image if the type of the coded image to be overlaid onto the input image is equal to the type of the coded image iteratively embedded into the entire input image, a component configured to determine whether or not a coded image to be overlaid onto the input image overlaps the coded image embedded in the input image if the type of the coded image to be overlaid onto the input image is not equal to the type of the coded image iteratively embedded into the entire input image, and a component configured to specify whether or not to overlay the coded image to be overlaid onto the input image, depending on the size of an area, of the coded image embedded in the input image, where the coded image to be overlaid does not overlap, when it is determined that the overlap exists.

A method according to the present invention includes the steps of specifying overlay of a coded image onto an input image, and controlling of specifying, when a coded image has already been embedded in the input image before overlaying a coded image onto the input image, whether or not to overlay the coded image for overlay onto the input image depending on the type of the coded image for overlay.

A method according to the present invention includes the steps of, when used in a case that a coded image as the type to be iteratively embedded into an entire input image has already been embedded in the input image, performing control not to overlay a coded image to be overlaid onto the input image if the type of the coded image to be overlaid onto the input image is equal to the type of the coded image iteratively embedded into the entire input image, determining whether or not a coded image to be overlaid on the input image overlaps the coded image embedded in the input image if the type of the coded image to be overlaid onto the input image is not equal to the type of the coded image iteratively embedded into the entire input image, and specifying whether or not to overlay the coded image to be overlaid onto the input image, depending on the size of an area, of the coded image embedded in the input image, where the coded image to be overlaid does not overlap, when it is determined that the overlap exists.

A computer-readable recording medium according to the present invention records a program executing the above methods.

According to the present invention, it becomes possible to prevent a two-dimensional code already embedded from being corrupted when copying a document in which a two-dimensional code has already been embedded.

Furthermore, according to the present invention, it becomes possible to extract, when copying a document in which a two-dimensional code has already been embedded, information from both of a two-dimensional code already embedded and a two-dimensional code newly embedded, even if a new two-dimensional code is added and thus acquired image is printed.

Furthermore, according to the present invention, it becomes possible to prevent a two-dimensional code already embedded from being corrupted, when overlaying a document in which a two-dimensional code is embedded onto form data in which a two-dimensional code has already been embedded and then printing thus acquired image.

Furthermore, according to the present invention, it becomes possible to prevent a two-dimensional code from being corrupted, when printing print data acquired by overlaying a document in which a two-dimensional code is embedded onto form data in which a two-dimensional code has already been embedded, even if a new two-dimensional code is added and thus acquired print data is printed.

Further features of the present invention will become apparent from the following description of exemplary embodiments (with reference to the attached drawings).

BRIEF DESCRIPTION OF THE DRAWINGS

FIG. 15 shows combinations of the presence or absence of a setting for overlaying previously registered form data onto print data and the presence or absence of a setting for embedding of a two-dimensional code.

DESCRIPTION OF THE EMBODIMENTS

First, an information extracting method corresponding to an information embedding method used in the present embodiments will be discussed.

As discussed above, two types of information embedding methods exist, which are the iterative embedding method and the simple embedding method. Information extracting methods corresponding to the respective information embedding methods will be discussed.

In the following description, information extracting is performed by an image forming device. The image forming device extracts information from image read by a scanner using the information extracting methods. The image forming device includes a CPU and a storage. The CPU performs processing discussed as follows by reading a program and data stored in the storage.

(A) Iterative Embedding Method

Figure 1:
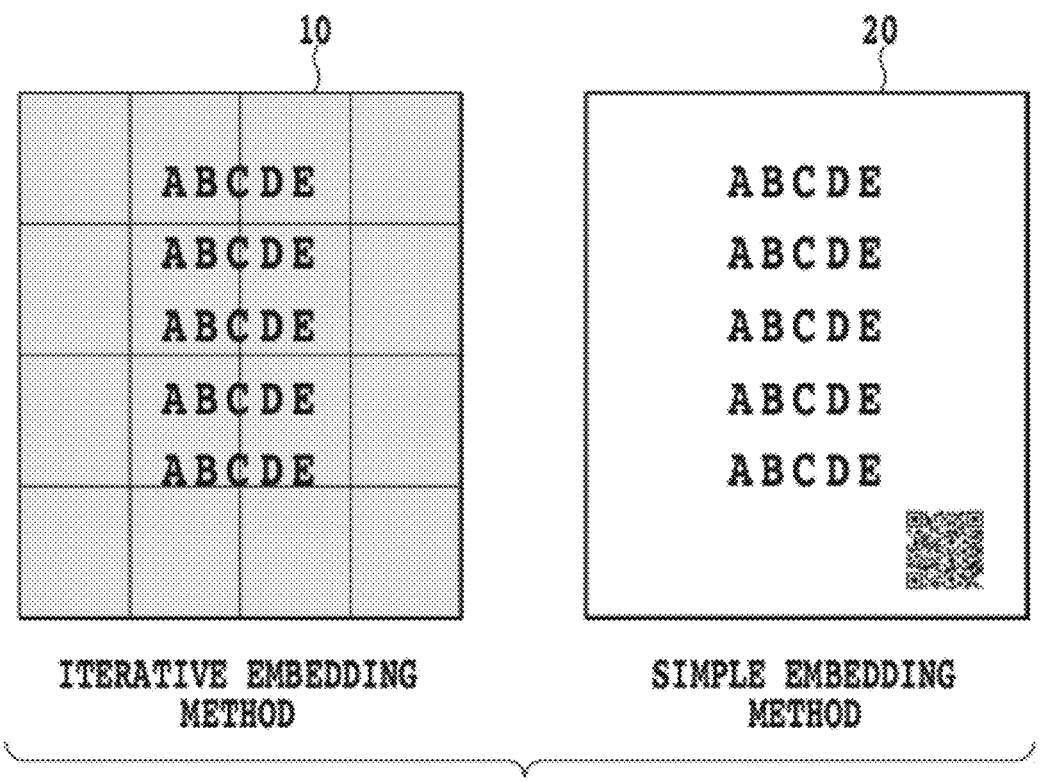
FIG. 1 shows a document in which a two-dimensional code is embedded using the iterative embedding method and a document in which a two-dimensional code is embedded using the simple embedding method.
Figure 2:
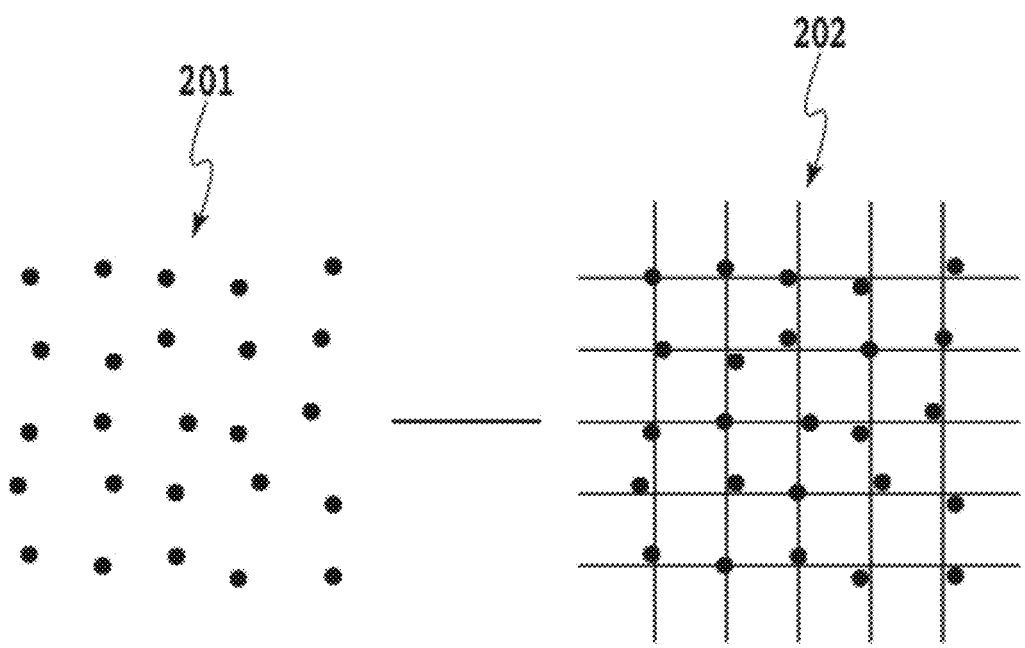
FIG. 2 shows an example of information embedding by the iterative embedding method.

An example of extracting information which has already been embedded on a document by printing dots as two-dimensional codes on the document, using the iterative embedding method, will be discussed. The iterative embedding method prints two-dimensional codes on a whole surface of a document and therefore an embedding method with visibility as low as possible is desired. In the embodiments, a two-dimensional code shown in FIG. 2 is taken as an example. In this two-dimensional code, dots are printed near intersections of virtual grids 202 drawn on a document as shown in FIG. 2 and information is embedded by the displacements of the dots from the intersections.

Figure 3:
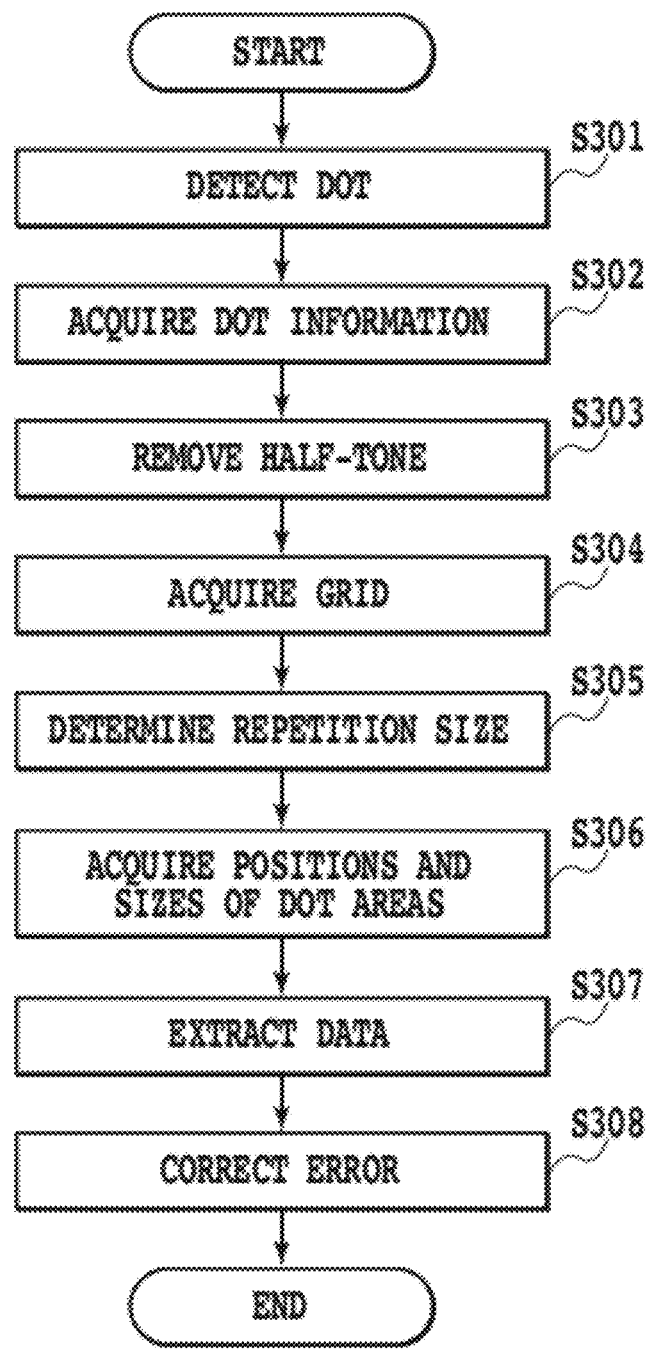
FIG. 3 is a flow chart showing the flow of processing to extract a two-dimensional code embedded in an input image by the iterative embedding method.

FIG. 3 is a flow chart showing the flow of processing to extract a two-dimensional code which has already been embedded in an input image by the iterative embedding method. When an image read by the scanner is input, an image forming device scans the input image to detect dots included in the input image (S301).

The image forming device acquires dot information such as absolute coordinates, sizes, and densities of all dots detected (S302).

The image forming device performs half-tone removal processing to delete dots other than information dots related to embedded information from the detected dots on the basis of acquired dot information in order to detect only the information dots (S303).

The image forming device measures distances between the detected information dots and dots adjacent to the information dots and acquires a grid interval in order to reproduce grids. Furthermore, the image forming device measures angles between adjacent information dots and all of the information dots and acquires rotation angles of the grids (S304). The image forming device measures relative positions of the information dots relative to intersections of the grids (202 in FIG. 2) after acquiring the grid intervals and the rotation angles.

The image forming device determines a repetition size of data areas in which data is embedded iteratively in order to acquire the positions and sizes of respective data areas (S305).

The image forming device acquires the positions and sizes of information dots existing in the data areas in which data is embedded repeatedly (S306) and extracts embedded data (S307). Finally, the image forming device performs error correction processing on the extracted data (S308) to acquire embedded information.

Discussed above is one example of information extracting method corresponding to the iterative embedding method shown in the embodiments. The present invention is not limited to this and may use information extracting methods corresponding to other iterative embedding methods.

(B) Simple Embedding Method

An extracting method for extracting a two-dimensional code (QR code) which has already been embedded by the simple embedding method will be discussed.

Figure 4:
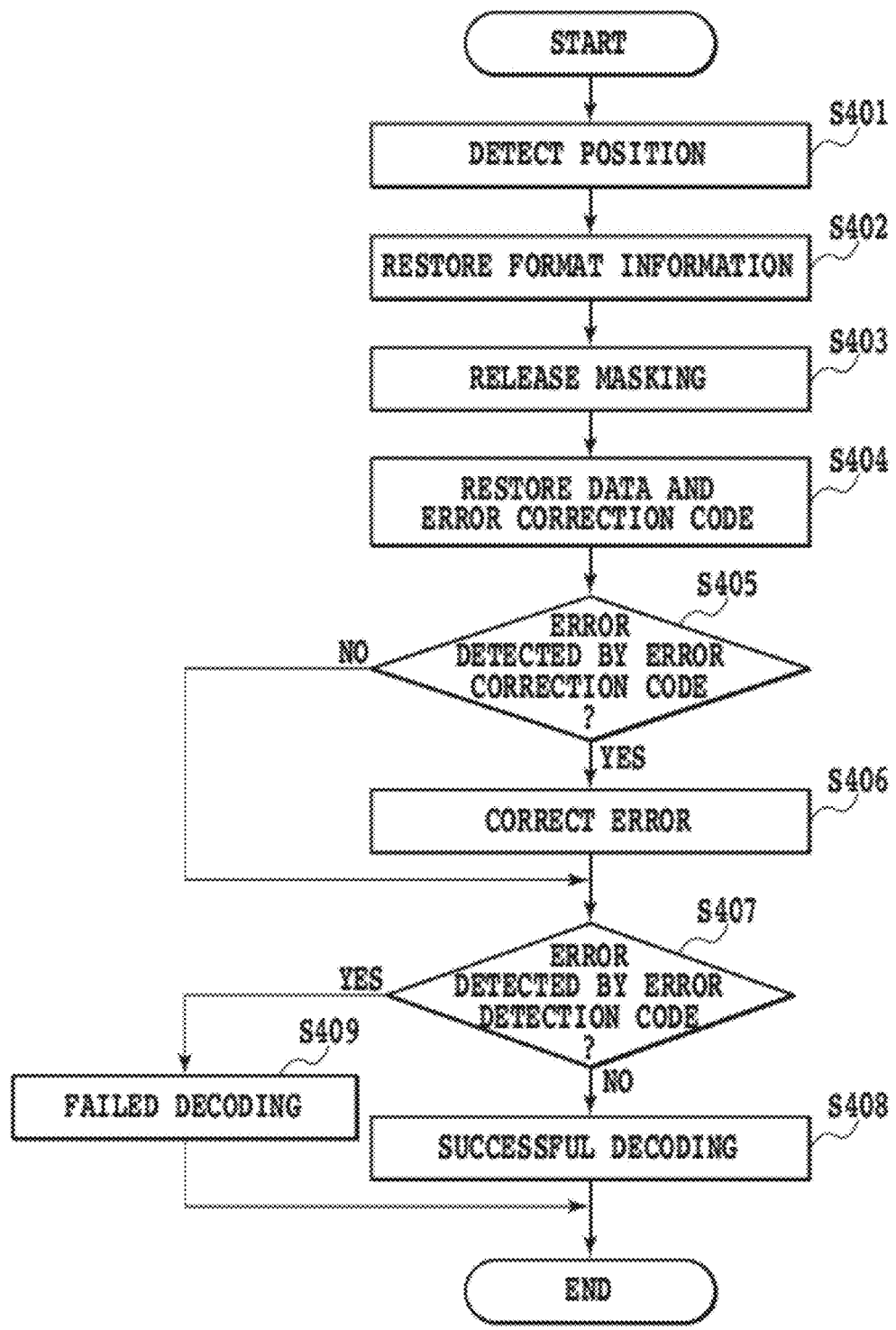
FIG. 4 is a flow chart showing the flow of processing to extract a two-dimensional code added in an input image.

FIG. 4 is a flow chart showing the flow of processing to extract a two-dimensional code added in an input image.

When an image read by the scanner is input, the image forming device scans the input image to detect the position of a predetermined two-dimensional code (S401). The position of the two-dimensional code is detected using the same clipped symbol pattern arranged at three of the four corners of the two-dimensional code.

The image forming device restores format information adjacent to the clipped symbols and acquires error correction levels and mask patterns applied to the symbols (S402).

The image forming device releases the masking by operating XOR of the encoded area bit patterns using the acquired mask patterns (S403).

The image forming device reads a symbol character according to an arrangement rule corresponding to a model and restores the data and error correction code of a message (S404).

The image forming device applies the error correction code to the restored data and determines whether or not an error exists in the restored data (S405), and corrects the error when an error exists in the data (S406).

The image forming device applies an error detection code to the error-corrected data and determines whether or not an error exists in the data (S407). When no error exists in the data, the image forming device determines that decoding of the extracted data was successful and outputs the data (S408). In contrast, when an error exists in the data, the image forming device determines that decoding of the extracted data was failed and finishes the processing (S409).

Discussed above is one example of information extracting method corresponding to the simple embedding method shown in the embodiments. The present invention is not limited to this and may use information extracting methods corresponding to other simple embedding methods.

Next, problems in the case that multiple two-dimensional codes are printed on the same paper will be discussed.

Here discussed are problems in the case that when a document on which a two-dimensional code has already been printed is copied and a new two-dimensional code is printed thereon, information is extracted from each of the two-dimensional codes printed on the copy of the document. In the following description, a two-dimensional code already printed on a document is referred to as a second two-dimensional code (second coded image), and a two-dimensional code to be newly printed on the copy of the document is referred to as a first two-dimensional code (first coded image).

The following Table 2 shows embedding methods of a first two-dimensional code, embedding methods of a second two-dimensional code, and extraction results acquired when information is extracted from a document in which the two two-dimensional codes have already been embedded. "○" in the extraction result column represents that information can be extracted, "x" represents that information can not be extracted, and "Δ" represents that information can be extracted in some cases and can not be extracted in the other cases.

TABLE 2

| | Embedding Method | | Extraction Result | | |
|---|---|---|---|---|---|
| | Second two-dimensional code | First two-dimensional code | Second two-dimensional code | First two-dimensional code | Description |
| 1 | Iterative embedding method | Iterative embedding method | x | x | Information of both codes can not be restored because two-dimensional codes overlap each other in a whole surface of a document. |
| 2 | Iterative embedding method | Simple embedding method | Δ | ○ | Second two-dimensional codes are partially corrupted by a first two-dimensional code. However, if some areas are remained in second two-dimensional codes, information of second two-dimensional codes can be restored. |
| 3 | Simple embedding method | Iterative embedding method | x | ○ | Information of the second two-dimensional code can not be restored because a first two-dimensional code is printed on a second two-dimensional code. |
| 4 | Simple embedding method | Simple embedding method | Δ | Δ | If both codes do not overlap each other, information can be restored. |

As understood from Table 2, when two-dimensional codes are printed overlapping each other, information can not be restored. Since whether information can be restored or not depends on the printing order of the two-dimensional codes and the characteristics of the embedding methods thereof, embodiments will be discussed below with reference to Table 2.

First Embodiment

In the first embodiment, the processing of embedding control will be discussed which controls not to allow a second two-dimensional code already embedded in the document to overlap a first two-dimensional code to be newly embedded, when embedding information during copying using the above information embedding technology.

Figure 5:
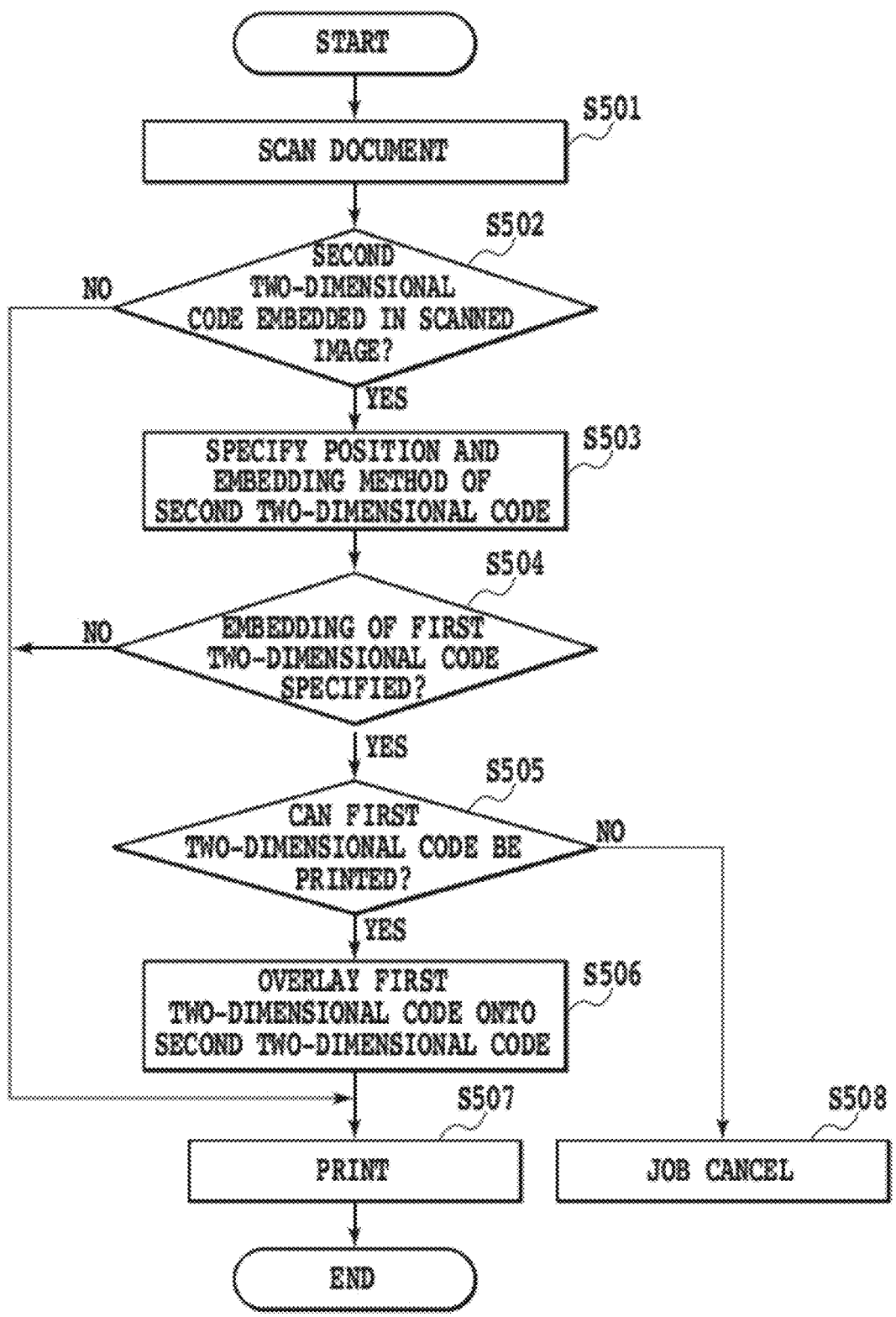
FIG. 5 is a flow chart showing a processing of a first embodiment.

FIG. 5 is a flow chart showing the processing of the first embodiment.

A scanner scans a document and sends a scanned image to an image forming device (S501).

The image forming device determines, when receiving the image from the scanner, whether or not a second two-dimensional code has already been embedded in the input image (scanned image) (S502). When no second two-dimensional code has already been embedded in the input image, the image forming device continues the copy operation and performs printing (S507). In contrast, when a second two-dimensional code has already been embedded in the input image, the image forming device identifies the position and embedding method of the second two-dimensional code (S503).

The image forming device determines whether embedding a first two-dimensional code which is a new two-dimensional code is specified as a setting for copying (S504). When embedding a first two-dimensional code is not specified, the image forming device continues the copy operation and performs printing (S507). In contrast, when embedding a first two-dimensional code is specified, the image forming device determines whether or not the first two-dimensional code can be printed (S505).

Here, a determining process (S505) for determining whether or not a first two-dimensional code can be printed (embedded) will be discussed in detail.

Figure 6:
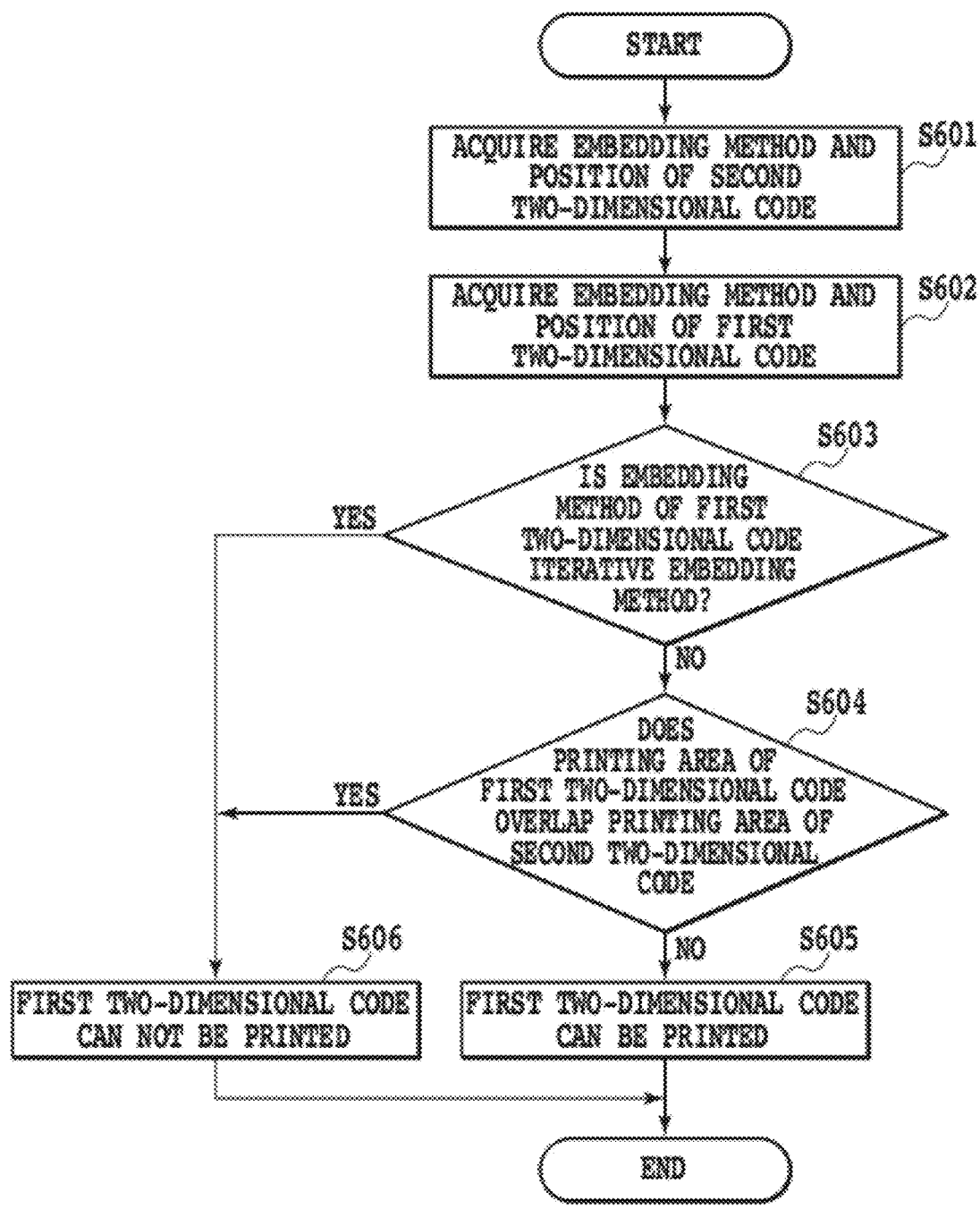
FIG. 6 is a flow chart showing the flow of a determining process of determining whether or not a first two-dimensional code can be printed, in the first embodiment.

FIG. 6 is a flow chart showing the flow of the determining process (S505) for determining whether or not a first two-dimensional code can be printed.

The image forming device acquires the type of the embedding method of a second two-dimensional code (an iterative embedding method or a simple embedding method) and the positional information of the printing area of the second two-dimensional code (S601).

The image forming device acquires the type of the embedding method of a first two-dimensional code and the positional information of the printing area of the first two-dimensional code (S602).

If the embedding method of the first two-dimensional code is an iterative embedding method, the image forming device determines that the first two-dimensional code can not be printed (S606), because the first two-dimensional code may corrupt the second two-dimensional code when the first two-dimensional code is printed on the second two-dimensional code, as shown in Table 2.

If the embedding method of the first two-dimensional code is a simple embedding method, the image forming device determines whether or not the printing area of the first two-dimensional code overlaps the printing area of the second two-dimensional code (S604). If the printing area of the first two-dimensional code overlaps the printing area of the second two-dimensional code as the result of the determination, the image forming device determines that the first two-dimensional code can not be printed (S606), because the second two-dimensional code may be corrupted when the first two-dimensional code is embedded, as shown in Table 2. In contrast, if the printing area of the first two-dimensional code does not overlap the printing area of the second two-dimensional code, the image forming device determines that the first two-dimensional code can be printed (S605) and then finishes the processing.

The description returns to the flow chart shown in FIG. 5.

In S505, if it is determined that the first two-dimensional code can be printed, the image forming device overlays the first two-dimensional code onto the second two-dimensional code in the input image (S506) and then performs printing (S507). In contrast, if it is determined that the first two-dimensional code can not be printed, the image forming device cancels a job (S508). Note that, the image forming device may copy the input image as it is without overlaying the first two-dimensional code instead of canceling the job. Furthermore, the image forming device may include a component for determining whether to cancel the job when it is determined that the first two-dimensional code can not be printed, based on a setting value by a user.

As discussed above, according to the first embodiment, when a document in which a two-dimensional code has already been embedded is copied, embedding of a new two-dimensional code can be controlled so as not to corrupt the two-dimensional code.

Second Embodiment

In the second embodiment, the processing of embedding control guarantees a minimum area where information can be restored from a second two-dimensional code and a first two-dimensional code when the information is embedded using the above information embedding technology when the document is copied.

In the processing according to the second embodiment, a determining process for determining whether or not a first two-dimensional code can be printed (S505) is different from that shown in FIG. 5, and other processing is the same as that shown in FIG. 5. Thus, the determining process for determining whether or not a first two-dimensional code can be printed (S505) will be discussed in detail.

Figure 7:
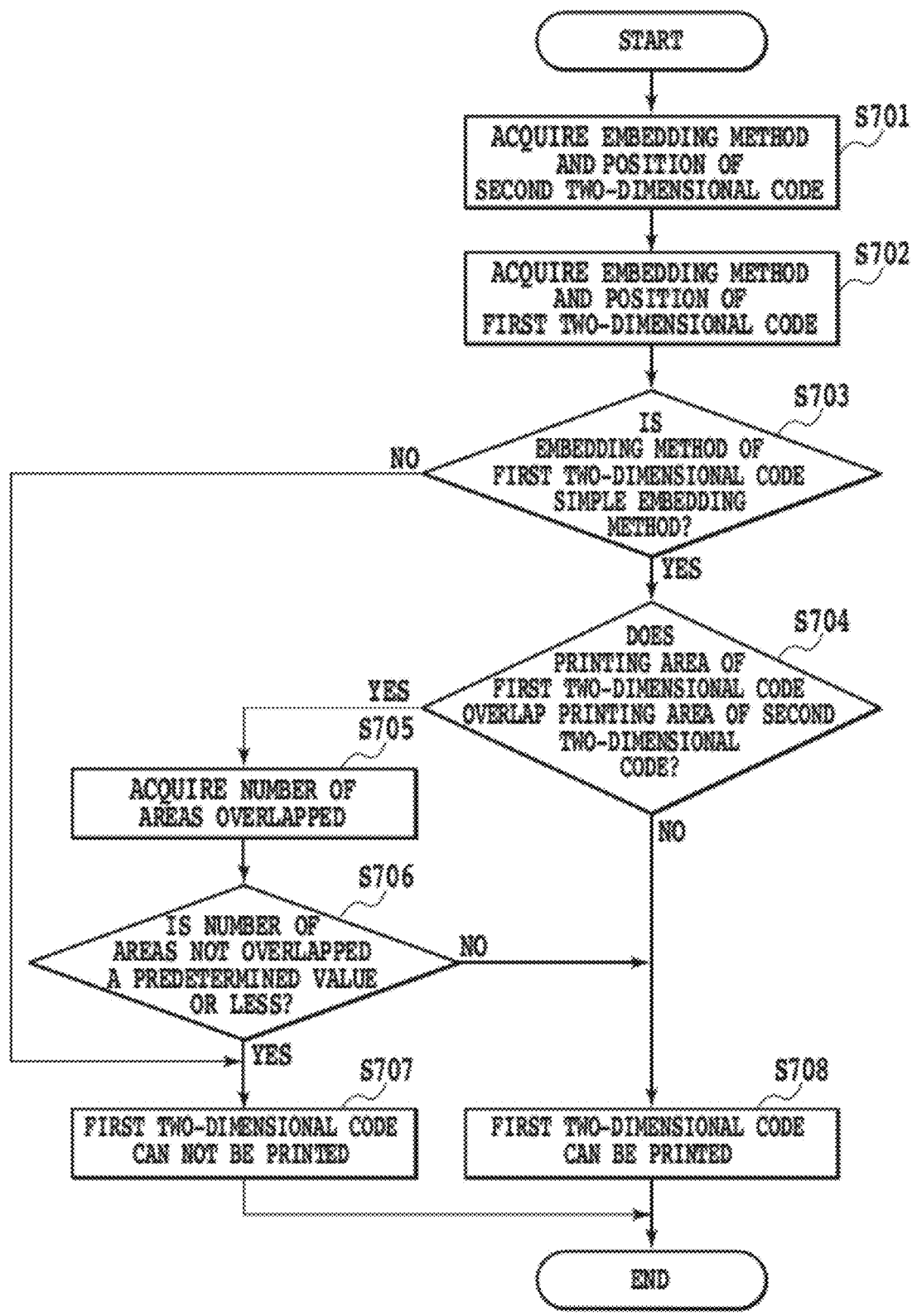
FIG. 7 is a flow chart showing the flow of a determining process of determining whether or not a first two-dimensional code can be printed, in a second embodiment.

FIG. 7 is a flow chart showing the flow of the determining process for determining whether or not the first two-dimensional code can be printed (S505).

The processing of S701 to S703 is the same as that of S601 to S603 shown in FIG. 6 and therefore the description thereof is omitted.

In the first embodiment, in S604, if the printing area of the first two-dimensional code overlaps that of the second two-dimensional code, it is determined unconditionally that the first two-dimensional code can not be printed assuming that information can not be restored from the second two-dimensional code. Because when the second two-dimensional code is embedded using the iterative embedding method, the second two-dimensional code is printed in the whole surface of a document and therefore the first two-dimensional code can not be embedded so as not to overlap the second two-dimensional code. However, according to the characteristic of the iterative embedding method, there is a case that even if part of the areas of the second two-dimensional code embedded using the iterative embedding method is lost, information can be restored from the remaining areas. In other words, if the embedding method of the first two-dimensional code is the simple embedding method, there is a case that even if the first two-dimensional code is printed on the second two-dimensional code, information can be restored from the first two-dimensional code and the second two-dimensional code (the case 2 in Table 2). However, a minimum area to restore information is necessary even for the iterative embedding method. In the second embodiment, a determining processing using the characteristic of the iterative embedding method is performed.

If it is determined that the embedding method of the first two-dimensional code is equal to the simple embedding method in S703, the image forming device proceeds to S704.

The image forming device determines whether or not the printing area of the first two-dimensional code overlaps that of the second two-dimensional code (S704), and proceeds to S705 if an overlap exists.

Figure 8:
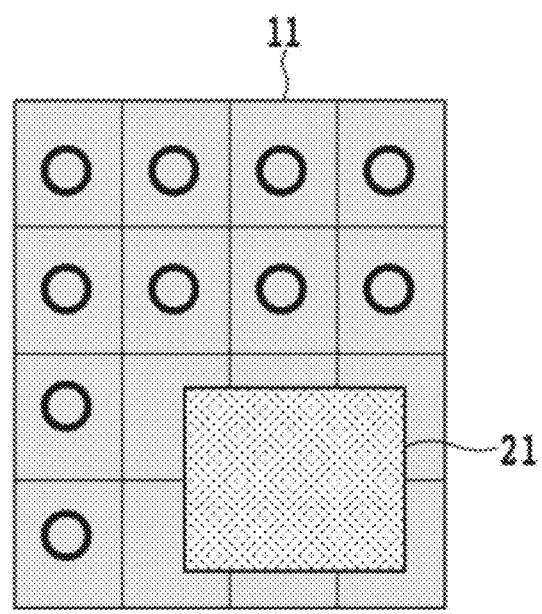
FIG. 8 shows the state that a first two-dimensional code is printed on a second two-dimensional code.

The image forming device acquires the number of areas of the second two-dimensional code which do not overlap the area of the first two-dimensional code on the basis of the positional information of the second two-dimensional code and the positional information of the first two-dimensional code, which are acquired in S701 and S702 (S705). FIG. 8 shows the state that a first two-dimensional code 21 is printed on a second two-dimensional code 11. In the figure, the area on which a circle is attached (information embedding tile) is the area where both areas do not overlap each other. As understood from the figure, if a first two-dimensional code is embedded by the simple embedding method in a document in which a second two-dimensional code has already been embedded, the overwriting overlaying method is used. The overwriting overlaying means that pixels constituting the first two-dimensional code are selected. On the other hand, if a first two-dimensional code is embedded by the iterative embedding method in a document in which a second two-dimensional code has already been embedded, the OR overlaying method is used. The OR overlaying means that darker pixels are selected among pixels constituting the first two-dimensional code and pixels constituting the second two-dimensional code.

The image forming device compares the number of areas of the second two-dimensional code which do not overlap the first two-dimensional code with a predetermined value (S706). If the number of areas of the second two-dimensional code which do not overlap the first two-dimensional code is larger than the predetermined value, the image forming device determines that information can be restored even if the first two-dimensional code is printed on the second two-dimensional code and determines that the first two-dimensional code can be printed. In contrast, if the number of areas of the second two-dimensional code which do not overlap the first two-dimensional code is less than the predetermined value, the image forming device determines that the information of the second two-dimensional code can not be restored when the first two-dimensional code is printed and determines that the first two-dimensional code can not be printed (S707).

The description returns to the flow chart shown in FIG. 5.

In S505, if it is determined that the first two-dimensional code can be printed, the image forming device overlays the first two-dimensional code onto the second two-dimensional code in the input image (S506) and then performs printing (S507). In contrast, if it is determined that the first two-dimensional code can not be printed, the image forming device cancels the job (S508). Note that, the image forming device may copy the input image as it is without overlaying the first two-dimensional code instead of canceling the job. Furthermore, the image forming device may have a component for determining whether to cancel the job if it is determined that the first two-dimensional code can not be printed, based on a setting value by a user.

As discussed above, according to the second embodiment, when a document in which a two-dimensional code has already been embedded is copied, a new two-dimensional code is embedded in consideration of a minimum area where information can be restored from the two-dimensional code, so that many types of two-dimensional codes can be embedded.

Third Embodiment

The first and second embodiments perform control to determine whether or not a specified new two-dimensional code (first two-dimensional code) can be printed during copying and not to print the new two-dimensional code if it is determined that the new two-dimensional code can not be printed. On the other hand, the third embodiment performs control to adjust the print position of a two-dimensional code newly embedded in a document according to the area of a two-dimensional code (second two-dimensional code) already embedded in the document.

Figure 9:
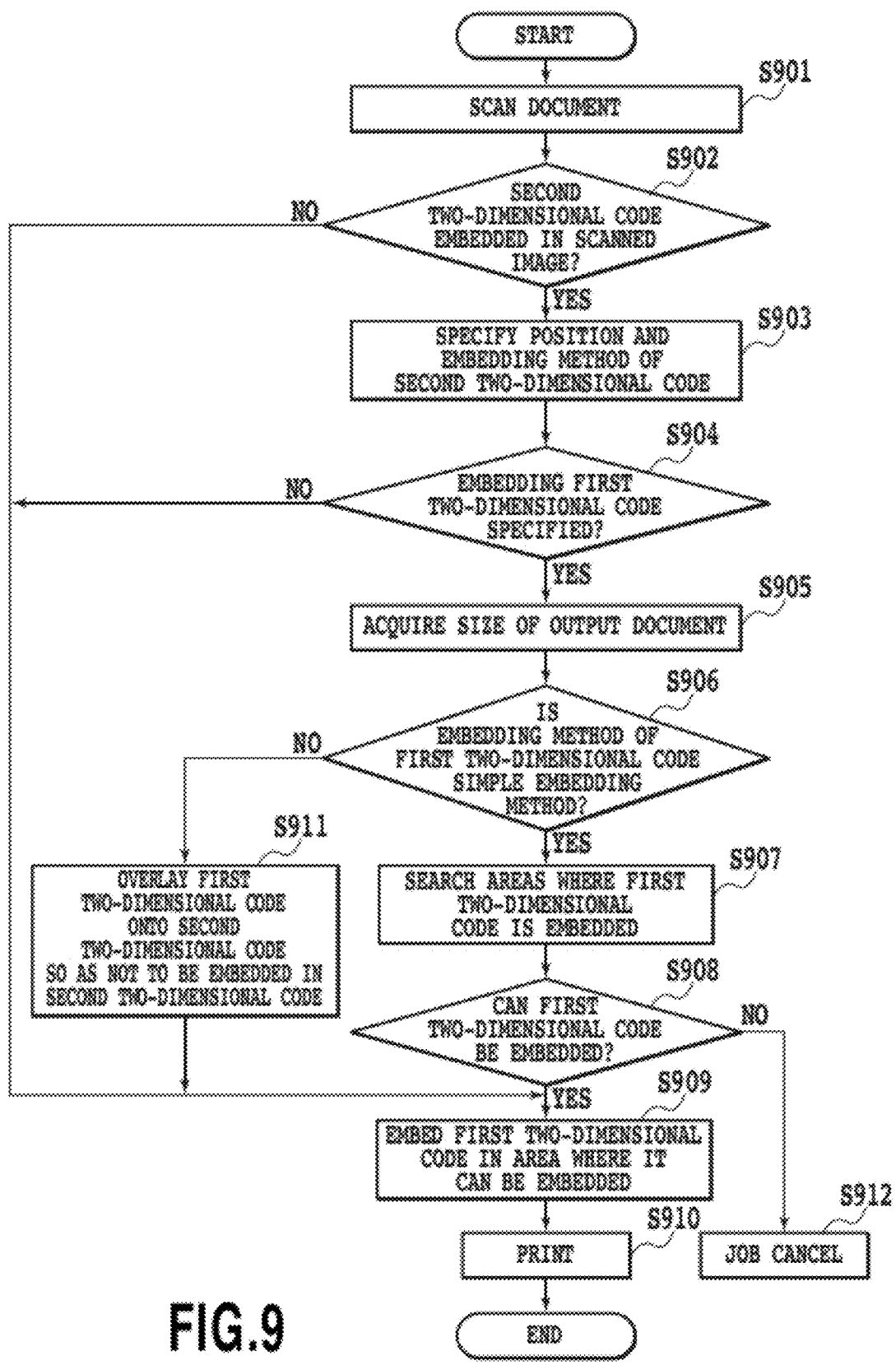
FIG. 9 is a flow chart showing the processing of a third embodiment.

FIG. 9 is a flow chart showing the processing of the third embodiment.

The processing of S901 to S903 is the same as that of S501 to S503 shown in FIG. 5 and therefore the description thereof is omitted. The image forming device determines whether or not embedding a first two-dimensional code which is a new two-dimensional code is specified as a setting for copying (S904). If embedding a first two-dimensional code is not specified, the image forming device continues the copy operation and performs printing (S910). In contrast, if embedding a first two-dimensional code is specified, the image forming device proceeds to S905.

The image forming device acquires the size of an output document (S905).

The image forming device determines whether the embedding method of the first two-dimensional code is equal to the simple embedding method or the iterative embedding method (S906), and proceeds to S907 in the case of the simple embedding method while proceeding to S911 in the case of the iterative embedding method.

If the embedding method of the first two-dimensional code is equal to the iterative embedding method, the image forming device overlays the first two-dimensional code onto the second two-dimensional code so as not to embed the first two-dimensional code in the printing area of the second two-dimensional code (S911) and then performs printing (S910). In contrast, if the embedding method of the first two-dimensional code is equal to the simple embedding method, the image forming device searches an area where the first two-dimensional code is embedded so as not to overlap the second two-dimensional code (S907), and determines whether or not the first two-dimensional code can be embedded in the searched area (S908).

Figure 10:
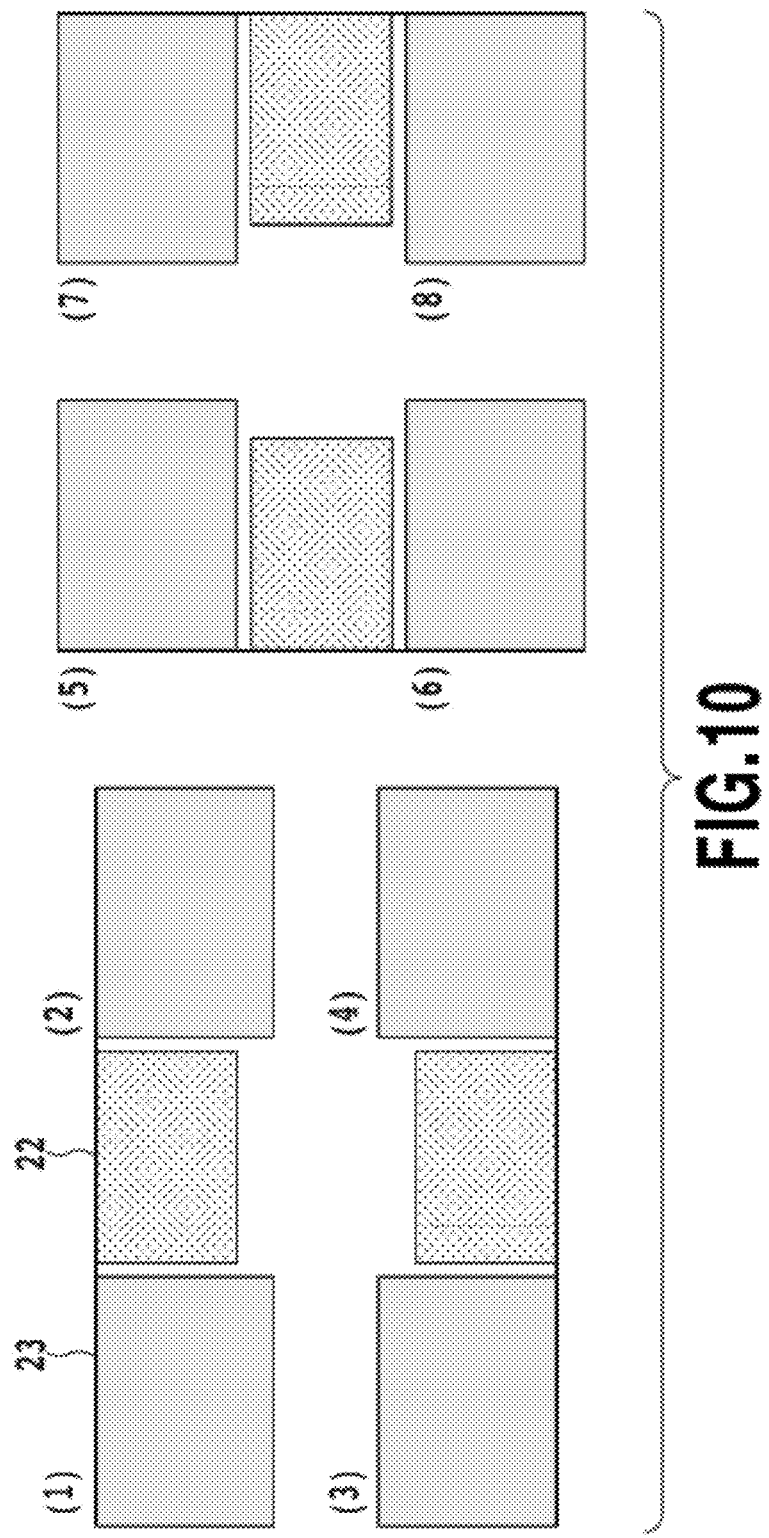
FIG. 10 is a diagram illustrating a search for an area where the first two-dimensional code is embedded.
Figure 11:
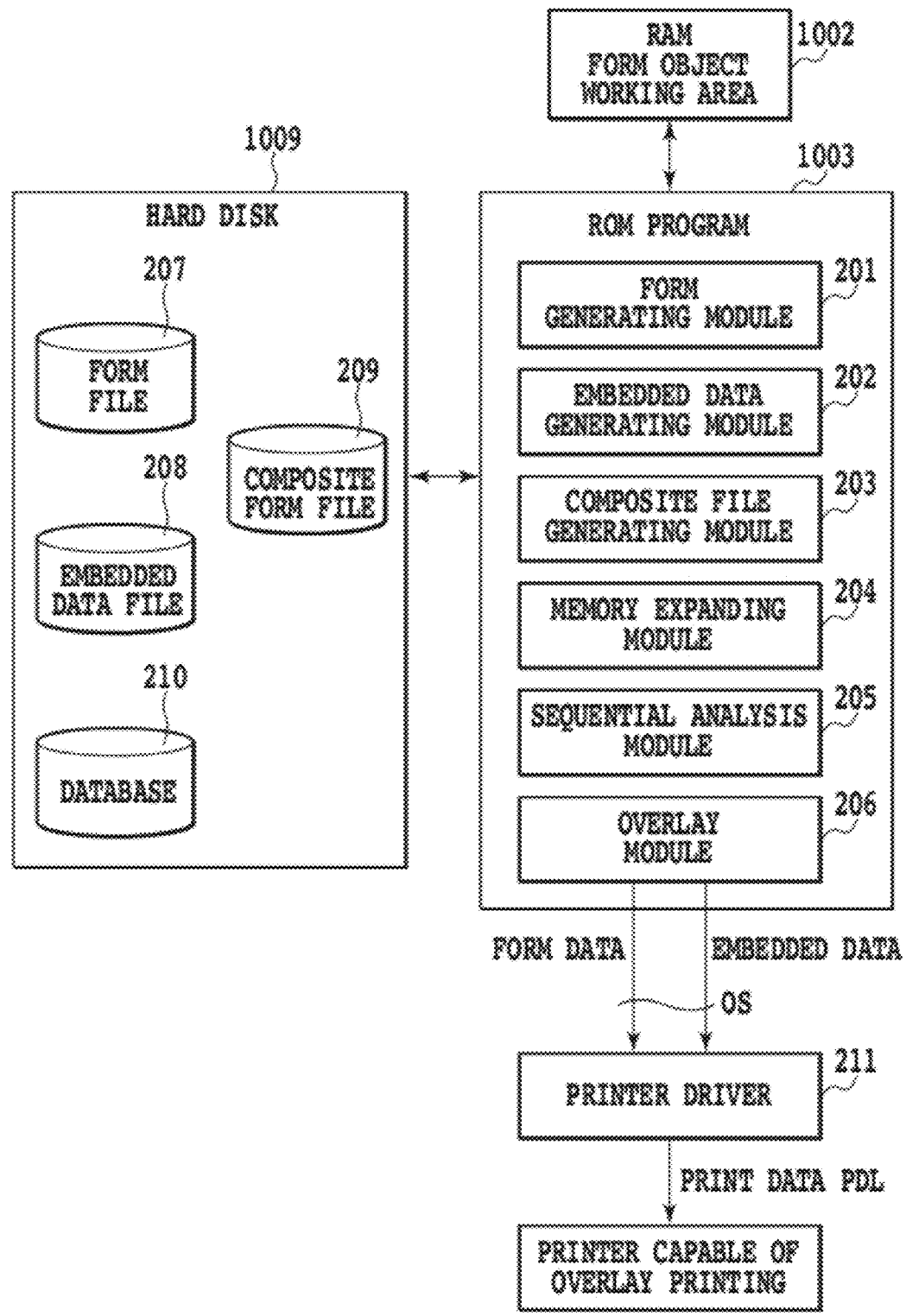
FIG. 11 is a block diagram showing a system data flow in a conventional art.

FIG. 10 depicts the search for an area where the first two-dimensional code is embedded. The search is performed by determining whether or not a first two-dimensional code 23 can be embedded in any one of the eight areas ((1) to (8)) around a second two-dimensional code 22. The image forming device determines it on the basis of the positional coordinate and size of the second two-dimensional code 22, the size of the first two-dimensional code 23, and the size of the printed document. If it is determined that it can be embedded in any one of the eight areas, the image forming device embeds the first two-dimensional code in the area where it can be embedded, and then performs printing (S909, S910). In contrast, if it is determined that it can not be embedded in any of the eight areas, the image forming device determines that the first two-dimensional code can not be embedded and cancels the job (S912). Note that, the image forming device may copy the input image as it is without overlaying the first two-dimensional code instead of canceling the job. Furthermore, the image forming device may have a component for determining whether or not the job is canceled if it is determined that the first two-dimensional code can not be printed, based on a value set by a user.

In the third embodiment, the image forming device determines whether the first two-dimensional code can be embedded in any one of the eight areas shown in FIG. 10, but may perform any other determining method or designate embedding position. For example, the image forming device may be configured so as to allow a user who has provided a copy setting to designate an embedding position of the first two-dimensional code.

As discussed above, according to the third embodiment, when a document in which a two-dimensional code has already been embedded is copied, the two-dimensional code already embedded can be prevented form being corrupted by embedding a new two-dimensional code. In addition, since a new two-dimensional code is embedded so as not to overlap the area where the two-dimensional code has already been embedded, many types of two-dimensional codes can be embedded.

Fourth Embodiment

In the fourth embodiment, processing is shown which overlays a document in which a two-dimensional code has already been embedded onto form data in which a two-dimensional code has already been embedded, using the above information embedding technology. Specifically, the processing of embedding control is shown which controls not to overlap a two-dimensional code already embedded in the form data onto a two-dimensional code already embedded in the document.

Figure 12:
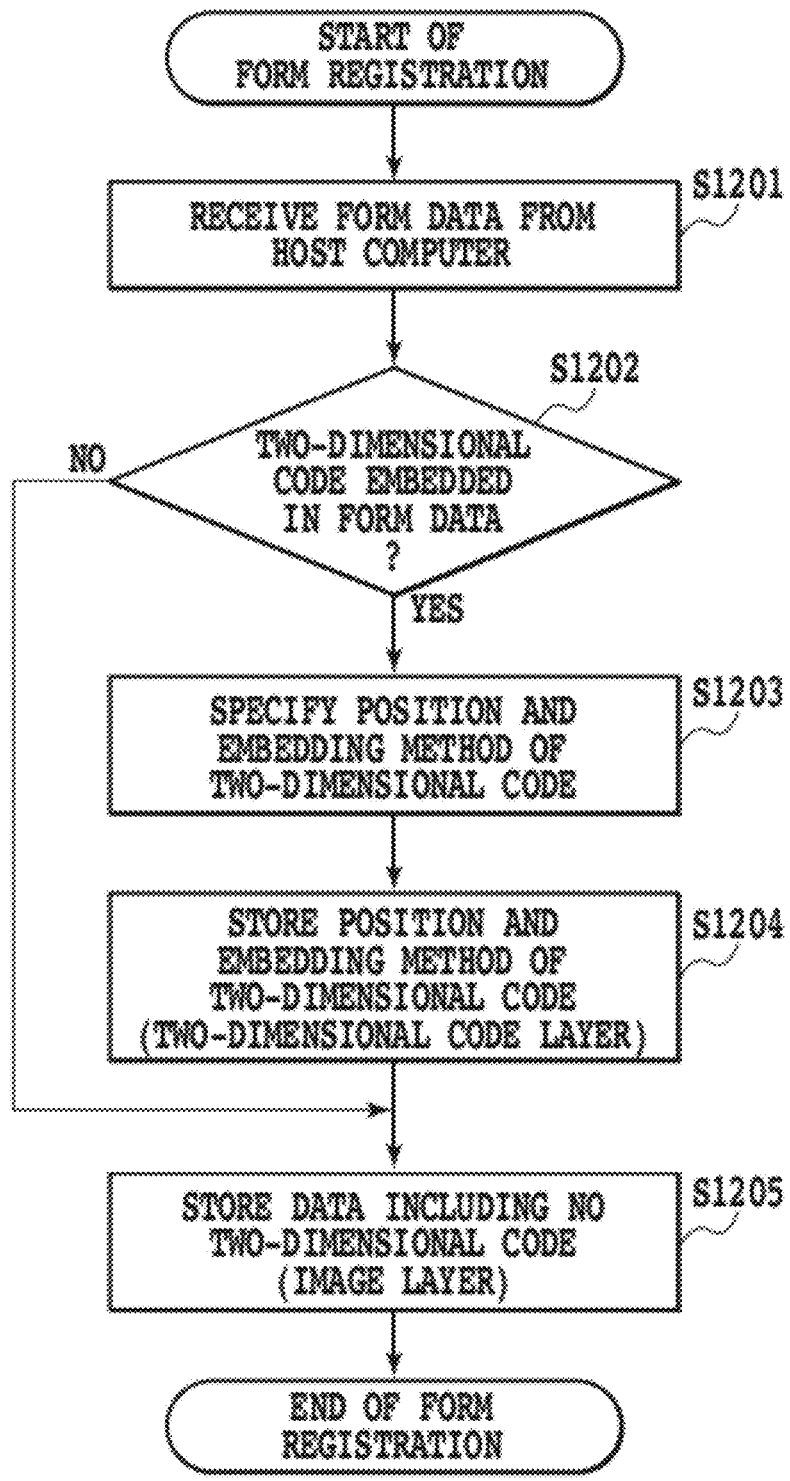
FIG. 12 is a flow chart showing the flow of a form data registration processing in a fourth embodiment.

FIG. 12 is a flow chart showing the processing of the fourth embodiment performed when form data is registered.

An image forming device receives form data from a host computer such as a personal computer or a server (S1201).

When receiving the form data from the host computer, the image forming device determines whether or not a two-dimensional code has already been embedded in the input image (form data) (S1202). When no two-dimensional code has already been embedded in the input image, the image forming device continues the form registering operation (S1205). In contrast, when a two-dimensional code has already been embedded in the input image, the image forming device identifies the position and embedding method of the two-dimensional code (S1203). Next, the image forming device makes a layer of only the two-dimensional code (two-dimensional code layer such as a digital watermark information layer) on the basis of the position and embedding method of the two-dimensional code identified in S1203 and stores the two-dimensional code layer in a storage (S1204). The image forming device then makes a layer (image layer) of only data including no two-dimensional code and stores the layer in the storage (S1205).

The two-dimensional code in the fourth embodiment may be either a first two-dimensional code or a second two-dimensional code.

Next, the operation of the image forming device in the fourth embodiment will be discussed with reference to FIG. 13.

The image forming device has a function of preventing a two-dimensional code included in form data registered in the processing shown in FIG. 12 from overlapping a two-dimensional code included in image data to be overlaid on the form data when the image data is input to the image forming device.

Figure 13:
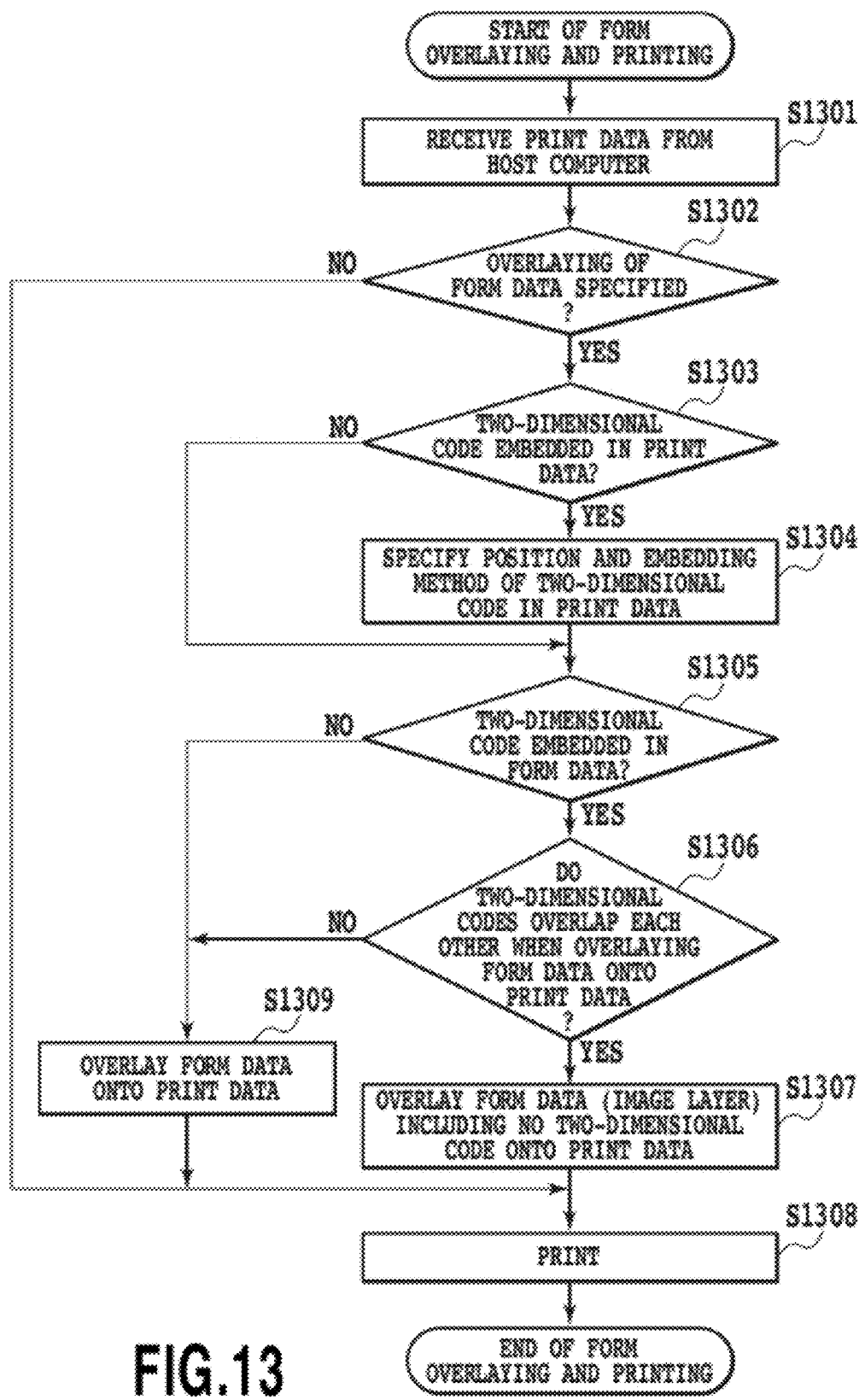
FIG. 13 is a flow chart showing the flow of a form overlay and print processing in the fourth embodiment.

In FIG. 13, the image forming device receives print data for printing from the host computer (S1301). The image forming device determines whether overlaying the form data registered in FIG. 12 is specified as a setting for printing (S1302). When overlaying the form data is not specified, the image forming device continues the printing operation and then performs printing (S1308). In contrast, when overlaying the form data is specified, the image forming device determines whether a two-dimensional code has already been embedded in the print data (S1303). If no two-dimensional code has already been embedded in the print data, the image forming device proceeds to S1305. If a two-dimensional code has already been embedded in the print data, the image forming device identifies the type and position of the two-dimensional code in the print data (S1304). Next, the image forming device determines whether a two-dimensional code has already been embedded in the form data (S1305). If no two-dimensional code has been embedded in the form data, the image forming device overlays the form data onto the print data (S1309). If a two-dimensional code has already been embedded in the form data, the image forming device determines whether the two-dimensional code in the form data overlaps the two-dimensional code in the print data when overlaying the form data onto the print data (S1306). If the two-dimensional code in the form data does not overlap the two-dimensional code in the print data, the image forming device overlays the form data on the print data (S1309). If the two-dimensional code in the form data overlaps the two-dimensional code in the print data, the image forming device overlays data (image layer) including no two-dimensional code in the form data on the print data (S1307). In other words, the image forming device does not overlay the two-dimensional code in the form data. Next, the image forming device prints the print data overlaid in S1307 (S1308).

Here, processing performed when the image forming device receives print data from a host computer is discussed. However, also when the image forming device receives copied data for copying from a scanner connected with the image forming device, the same units as that of the embodiment may be used.

As discussed above, according to the fourth embodiment, two-dimensional code embedding can be controlled so as not to corrupt a two-dimensional code when printing print data in which a two-dimensional code is embedded in the state that overlaying form data in which a two-dimensional code is embedded on print data is specified.

Fifth Embodiment

Figure 15:
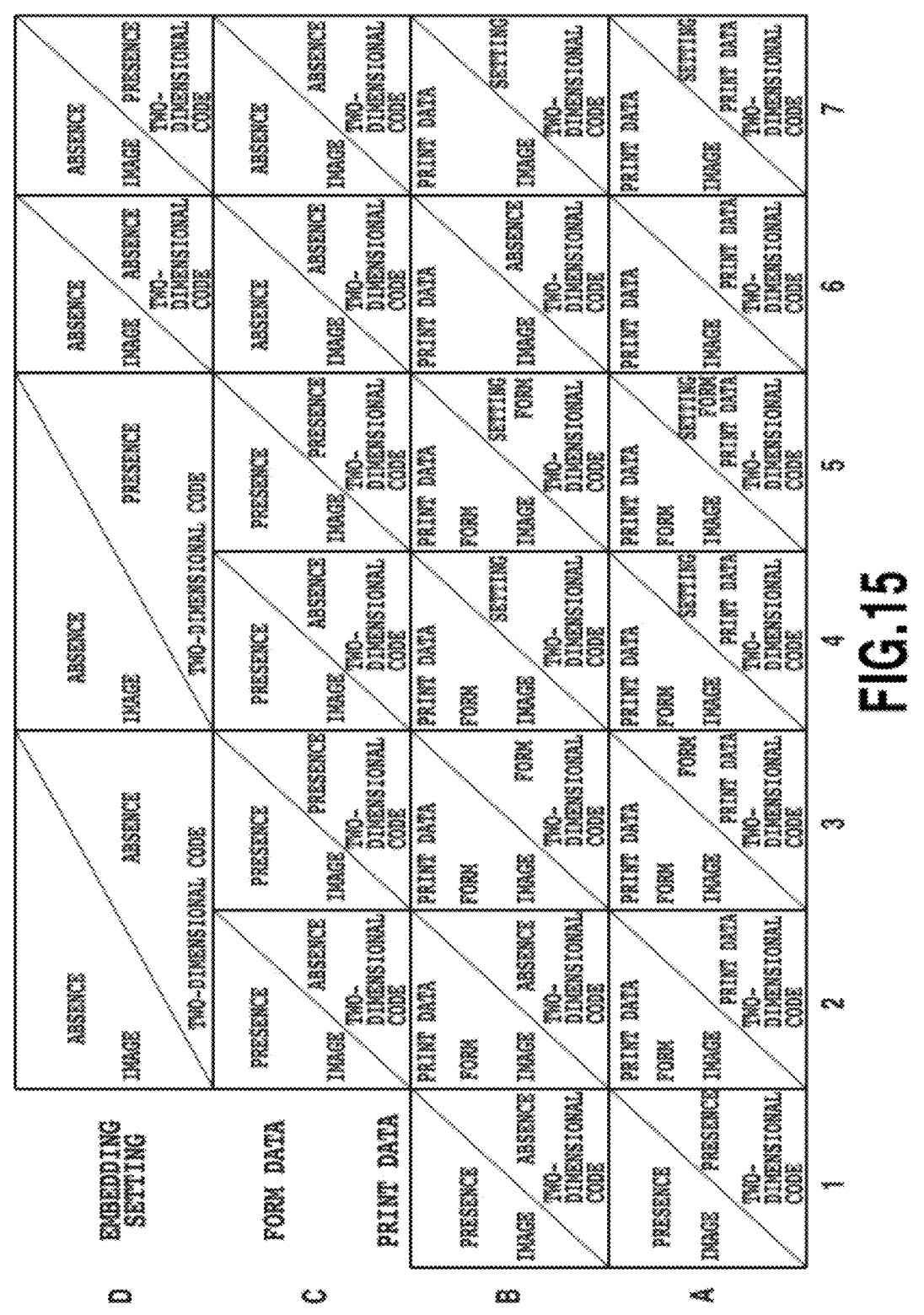

In the fifth embodiment, the operation of an image forming device which has been set to overlay previously registered form data onto the print data and embed a two-dimensional code (setting of adding a two-dimensional code) will be discussed. FIG. 15 shows combinations of the presence or absence of a setting for overlaying the previously registered form data onto the print data and the presence or absence of a setting for embedding of a two-dimensional code, and shows print results.

In FIG. 15, the upper part above the oblique line of each cell shows an image data configuration, and cells in which two or more components are written as the image data configuration show that the images overlapping each other are printed. The lower part below the oblique line of each cell shows a two-dimensional code configuration. Cells in which two or more components are written as the two-dimensional code configuration represent that when the two-dimensional codes do not overlap, all of the two-dimensional codes are printed. Furthermore, the cells represent that when part of the two-dimensional codes overlap each other, two-dimensional codes which do not overlap each other are printed. Furthermore, the cells represent that when all of the two-dimensional codes overlap each other, any one of the two-dimensional codes is printed. The first column of the row A and the first column of the row B represent the presence or absence of image data in the print data and the presence or absence of a two-dimensional code in the print data, the row C represents the presence or absence of image data in the form data and the presence or absence of a two-dimensional code in the form data, and the row D represents the presence or absence of image data for which embedding has been set and the presence or absence of a two-dimensional code for which embedding has been set. The second to seventh columns of the row A and the second to seventh columns of the row B represent the configurations of image data and a two-dimensional code of data which has been printed.

Next, the operation of the image forming device in the fifth embodiment will be discussed with reference to FIG. 14.

The image forming device has a function of preventing two-dimensional codes from overlapping each other when form data registered in the processing shown in FIG. 12 and image data to be overlaid on the form data are input to the image forming device. Specifically, the image forming device has a function of preventing a two-dimensional code included in the form data, a two-dimensional code included in the image data, and a two-dimensional code to which forced embedding is set for the image forming device from overlapping each other.

Figure 14:
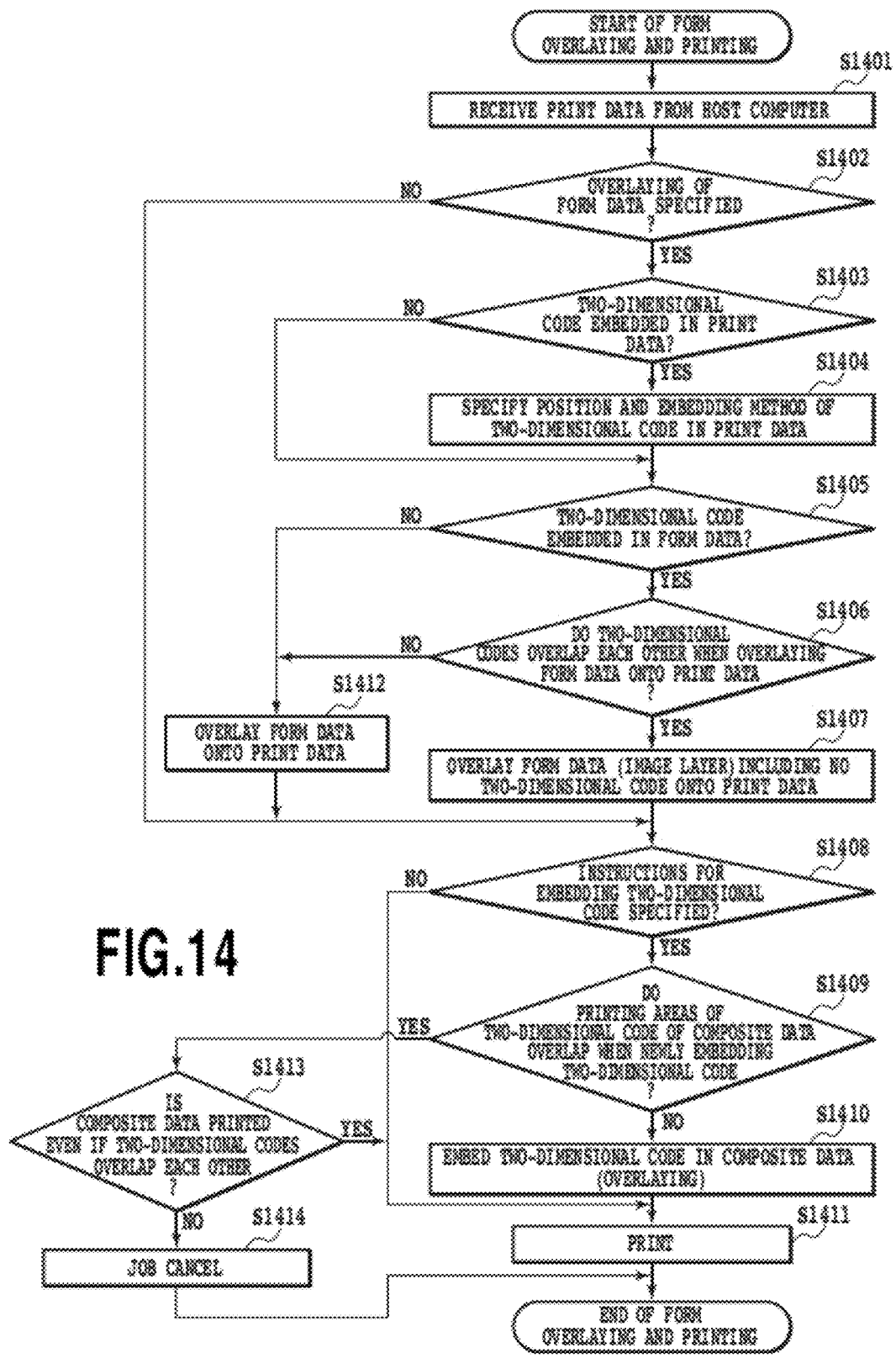
FIG. 14 is a flow chart showing the flow of a form overlay and print processing in a fifth embodiment.

In FIG. 14, the image forming device receives print data from a host computer (S1401). The image forming device determines whether overlaying the form data registered in FIG. 12 is specified as a setting for printing (S1402). If overlaying the form data is not specified, the image forming device proceeds to S1408. In contrast, if overlaying the form data is specified, the image forming device determines whether a two-dimensional code has already been embedded in the print data (S1403). If no two-dimensional code has already been embedded in the print data, the image forming device proceeds to S1405. If a two-dimensional code has already been embedded in the print data, the image forming device identifies the type and position of the two-dimensional code in the print data (S1404).

Next, the image forming device determines whether a two-dimensional code has already been embedded in the form data (S1405). If no two-dimensional code has been embedded in the form data, the image forming device overlays the form data onto the print data (S1412). If a two-dimensional code has already been embedded in the form data, the image forming device determines whether the two-dimensional code in the form data overlaps the two-dimensional code in the print data when overlaying the form data on the print data (S1406). If the two-dimensional code in the form data does not overlap the two-dimensional code in the print data, the image forming device overlays the form data onto the print data (S1412). If the two-dimensional code in the form data overlaps the two-dimensional code in the print data, the image forming device overlays data (image layer) including no two-dimensional code in the form data onto the print data, and does not overlay the two-dimensional code in the form data onto the print data (S1407).

Next, the image forming device determines whether embedding (forced embedding) of a two-dimensional code has been set for the own device (S1408). If the forced embedding has not been set, the image forming device prints the print data overlaid in S1412 or S1407 (S1411).

Next, when embedding (forced embedding) of a two-dimensional code has been set for the image forming device, the image forming device determines whether or not, if the two-dimensional code is embedded, the two-dimensional codes overlaps each other (S1409). Specifically, the image forming device determines, when overlying the print data overlaid in S1412 or S1407 onto a two-dimensional code to be embedded according to the setting, whether a two-dimensional code in the print data overlaid in S1412 or S1407 overlaps a two-dimensional code embedded according to the setting. If the two-dimensional code in the print data overlaid in S1412 or S1407 overlaps the two-dimensional code embedded according to the setting, the image forming device determines whether it has been set to make a print even if the two-dimensional codes overlap each other (S1413). When it has been set to make a print even if the two-dimensional codes overlap each other, the image forming device performs printing (S1411). If it has been set not to perform printing when the two-dimensional codes overlap each other, the image forming device cancels the printing job (S1414). Furthermore, if it is determined in S1409 that two-dimensional codes in the print data overlaid in S1412 or S1407 do not overlap a two-dimensional code embedded according to the setting, the image forming device proceeds to S1410. In S1410, the image forming device overlays two-dimensional codes in the print data overlaid in S1412 or S1407 onto a two-dimensional code embedded according to the setting (S1410) and prints data overlaid in S1410 (S1411).

As discussed above, the image forming device determines whether a two-dimensional code is included in an input image, whether addition of a two-dimensional code has been set for the image forming device, and whether a two-dimensional code is included in form data to be overlaid onto the input image. The image forming device then determines whether a printout can be provided according to the results of the three determinations, and switches the two-dimensional codes of the printout.

Furthermore, the image forming device may be configured so as to have a specifying unit, a first detecting unit, a first synthesized image forming unit, a storage, a second detecting unit, a second synthesized image forming unit, and an output unit which performs processing discussed below.

The specifying unit specifies overlaying a first input image (print data) onto a first coded image (first two-dimensional code).

The first detecting unit detects whether a second coded image (second two-dimensional code) is included in the first input image (print data).

If the first detecting unit detects a second coded image (second two-dimensional code), the first synthesized image forming unit does not overlay the first input image (print data) onto the first coded image (first two-dimensional code). In contrast, if the first detecting unit detects no second coded image (second two-dimensional code), the first synthesized image forming unit overlays the first input image (print data) onto the first coded image (first two-dimensional code).

The storage stores a second input image (form data).

The second detecting unit detects whether a third coded image (third two-dimensional code) is included in the second input image (form data).

If the second detecting unit detects the third coded image (third two-dimensional code), the second synthesized image forming unit overlays a first synthesized image output by the first synthesized image forming unit onto a second input image (form data) including no third coded image (third two-dimensional code). In contrast, if the second detecting unit detects no third coded image (third two-dimensional code), the second synthesized image forming unit overlays a first synthesized image output by the first synthesized image forming unit and a second input image (form data) including the third coded image (third two-dimensional code).

The output unit outputs a second synthesized image by the second synthesized image forming unit.

According to the fifth embodiment, when printing print data in which a document in which a two-dimensional code has already been embedded is overlaid onto form data in which a two-dimensional code has already been embedded, the two-dimensional codes can be prevented from being corrupted even if a new two-dimensional code is added and thus acquired print data is printed.

Other Embodiments

It is assumed in the above description that form data is received from a host computer. However, form data may be input from any device capable of transferring image data such as a scanner connected with an image forming device.

In the first to third embodiments, it is discussed as an example to copy a document input from a scanner connected with an image forming device. However, print data may be input from any device capable of transferring image data to an image forming device as in the case that print data received from a host computer is printed like the fourth or fifth embodiment.

The objects of the present invention can also be achieved by a computer (or a CPU or an MPU) of a system or a device reading a program code for achieving operations (steps) configured as shown in the above embodiments recorded in a recording medium and executing the program code. The recording medium is a computer-readable recording medium. In this case, the program code itself read from the computer-readable recording medium realizes the functions of the above embodiments. For this reason, the program code and the recording medium in which the program code is recorded also constitute one of the present inventions.

As a recording medium for providing a program code, for example, a floppy (registered trademark) disk, a hard disk, an optical disk, a magneto-optical disk, a CD-ROM, a CD-R, a magnetic tape, a nonvolatile memory card, a ROM, or the like may be used.

It is also included in the present invention that an operating system (OS) or the like running on a computer on the basis of the instructions of the program code performs part or all of actual processing by which the functions of the above embodiments are realized.

In addition, a program code read from a recording medium is written in a memory provided in a function expanding board inserted in a computer or in a function expanding unit connected with a computer. After that, based on the instructions of the program code, a CPU or the like provided in the function expanding board or the function expanding unit performs part or all of actual processing by which the functions of the above embodiments are realized.

While the present invention has been discussed with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-228148, filed Sep. 3, 2007, and 2008-025744, filed Feb. 5, 2008, all of which are hereby incorporated by reference herein in their entirety.

What is claimed is:

1. A device comprising:
a specifying component configured to specify overlay of a first coded image onto an input image;
a detecting component configured to detect whether a second coded image is included in the input image; and
an output suspend component configured to suspend outputting the input image, if overlay of the first coded image is specified by the specifying component and the second coded image is detected by the detecting component.

2. The device of claim 1 further comprising:
an input component configured to input the input image in accordance with the specifying component; and
a judging component configured to judge whether there is an overlap of the first coded image and the second coded image, if the second coded image is detected by the detecting component,
wherein the output suspend component is further configured to suspend outputting the input image, if the judging component judges there is the overlap.

3. The device of claim 2 further comprising: if the judging component judges there is not the overlap,
an overlaying component configured to overlay the first coded image onto the input image; and
an outputting component configured to overlay the input image which is overlaid with the first coded image with the second coded image to output the overlaid image.

4. A device comprising:
a first component configured to determine whether an addition of an additional two-dimensional code to an input image is set;
a second component configured to determine whether a two-dimensional code is already included in the input image; and
a third component configured to determine, in a case where an addition of an additional two-dimensional code to the input image is set and a two-dimensional code is already included in the input image, whether the input image should be output or should not be output;
wherein the third component is configured to output the input image, in a case where the input image should be output, after adding the additional two-dimensional code to an area in the input image corresponding to a position of the two-dimensional code already included in the input image.

5. The device according to claim 4,
wherein the two-dimensional code included in the input image is different between the first and second cases.

6. A device comprising:
a specifying component configured to specify overlay of an image which is coded by an iterative embedding method or an image which is not coded by an iterative embedding method onto an input image;
a detecting component configured to detect whether a coded image is included in the input image;
an output suspend component configured to suspend outputting the input image, if overlay of the image which is coded by the iterative embedding method is specified by the specifying component and the coded image is detected by the detecting component; and
an outputting component configured to output the input image overlaid with the image which is not coded by the iterative embedding method, if overlay of the coded image which is not coded by the iterative embedding method is specified by the specifying component and the coded image is detected by the detecting component.

7. A method performed by one or more devices, the method comprising the steps of:
- specifying overlay of a first coded image onto an input image;
- detecting whether a second coded image is included in the input image; and
- suspending outputting the input image, if overlay of the first coded image is specified by the specifying step and the second coded image is detected by the detecting step,
- wherein the specifying step, detecting step, and suspending outputting step are performed by hardware of the one or more devices.

8. The method of claim 7 further comprising the steps of:
- inputting the input image in accordance with the specifying step; and
- judging whether there is an overlap of the first coded image and the second coded image, if the second coded image is detected by the detecting step,
- wherein the suspending step further comprises suspending outputting the input image, if it is judged by the judging step that there is the overlap.

9. The method of claim 8 further comprising the steps of: if it is judged by the judging step that there is not the overlap,
- overlaying the first coded image onto the input image; and
- overlaying the input image which is overlaid with the first coded image with the second coded image to output the overlaid image.

10. A method comprising the steps of:
- determining whether an addition of an additional two-dimensional code to an input image is set;
- determining whether a two-dimensional code is already included in the input image;
- determining, in a case where an addition of an additional two-dimensional code to the input image is set and a two-dimensional code is already included in the input image, whether the input image should be output or should not be output; and
- printing the input image, in a case where the input image should be output, after adding the additional two-dimensional code to an area in the input image corresponding to a position of the two-dimensional code already included in the input image.

11. The method according to claim 10,
wherein the two-dimensional code included in the input image is different between the first and the second cases.

12. A method comprising the steps of:
- specifying overlay of an image which is coded by an iterative embedding method or an image which is not coded by an iterative embedding method onto an input image;
- detecting whether a coded image is included in the input image;
- suspending outputting the input image, if overlay of the image which is coded by the iterative embedding method is specified by the specifying step and the coded image is detected by the detecting step; and
- printing the input image overlaid with the image which is not coded by the iterative embedding method, if overlay of the coded image which is not coded by the iterative embedding method is specified by the specifying step and the coded image is detected by the detecting step.

13. A non-transitory computer-readable recording medium having computer-executable instructions for performing a method recited in one of claims 7 to 12.

* * * * *